June 2, 1959     A. NUTTING ET AL     2,889,004
LIQUID PICKUP GAS TREATING DEVICE
Filed Sept. 8, 1952     3 Sheets-Sheet 1

INVENTOR.
ARTHUR NUTTING
ROBERT W. SEXTON
BY
Arthur J. Robert
ATTORNEY

June 2, 1959 A. NUTTING ET AL 2,889,004
LIQUID PICKUP GAS TREATING DEVICE
Filed Sept. 8, 1952 3 Sheets-Sheet 2

INVENTOR.
ARTHUR NUTTING
ROBERT W. SEXTON
BY
*Arthur J. Robert*
ATTORNEY

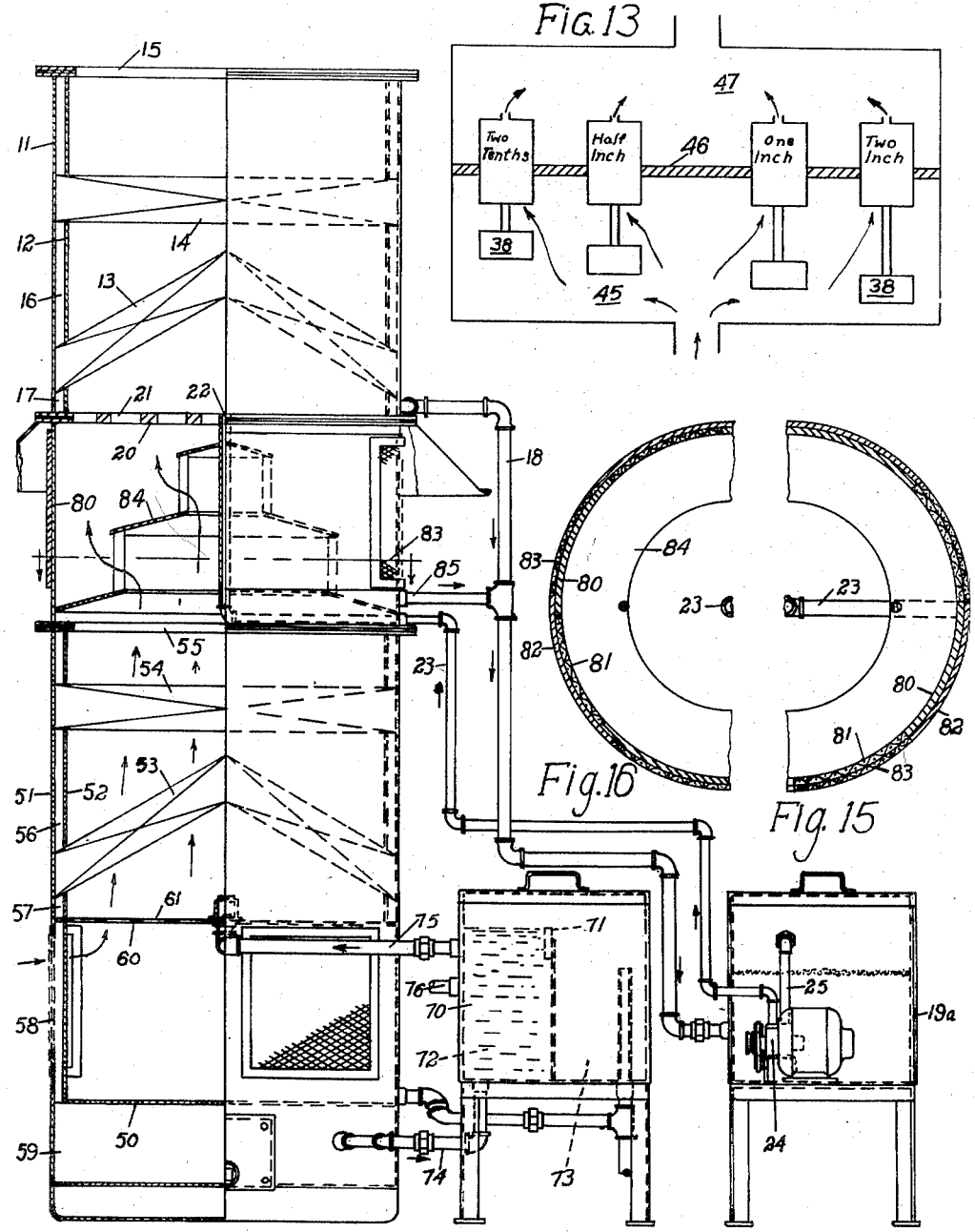

United States Patent Office 2,889,004
Patented June 2, 1959

2,889,004

LIQUID PICKUP GAS TREATING DEVICE

Arthur Nutting and Robert W. Sexton, Louisville, Ky., assignors to American Air Filter Company, Inc., Louisville, Ky., a corporation of Delaware Application September 8, 1952, Serial No. 308,454

22 Claims. (Cl. 183—15)

This invention relates to liquid pickup gas treating devices. While the invention is suited for use in various applications, it is herein primarily described as applied to self-cleaning gas cleaners of the liquid pickup class.

Figure 1 schematically shows one type of a conventional self-cleaning cleaner of this class wherein the incoming air enters the outer cylinder 1 through an inlet opening 2 and flows downwardly to pass through a horizontally arranged annular opening 3 where it impinges against the surface of the bath 4 to pick up liquid as it turns to flow upwardly successively through the inner cylinder of a centrifugal precleaner 5 within which a swirl is imparted to the air so as to centrifuge dust and liquid out of the air at the upper end of the precleaner cylinder, the swirling air with its residue liquid content continuing upwardly through the inlet cone 6 and the filter medium 7 to the clean gas outlet. The liquid and dust separated in the filter medium 7 drains into upper channel 8 and this drainage, together with the liquid and dust centrifuged into lower channel 9, ultimately drains through drain tube 10 back to the bath 4. The amount of liquid picked up and circulated progressively increases as the air flow increases while the tendency of the cleaner to blow liquid entirely through the filter medium into the clean air outlet progressively increases as both the air flow and the liquid in circulation increase. Consequently the highest air flow, which can be employed without blowing liquid, constitutes the maximum operating air flow of this type of cleaner.

While this particular type of air cleaner is in wide use today, it has a number of deficiencies. For example, it has a minimum operating air flow which is not readily variable. It has a relatively low or restricted maximum operating air flow because the swirl imparted to the air and residue liquid tends to effect an annular bandlike concentration of these materials in the filter medium and thus magnifies the tendency to blow liquid. Again, it has a relatively high operating resistance largely because the incoming air does a considerable amount of work between inlet 2 and the inlet face of the medium 7 in making the 180° turn, picking up a considerable amount of liquid, lifting and centrifuging that liquid and then conveying the residue liquid through the inlet cone 6 to the filter medium 7. Finally, its operating resistance increases as its size or capacity is increased because the increase in size, which must be based on a corresponding increase in the area of the filter medium, is necessarily accompanied by a substantially smaller increase in the area of opening 3. This disparity in area increase is due to the fact that the filter medium area increases rapidly since its increase is in direct proportion to the square of the diameter of the precleaner cylinder 5 whereas the area of the circumferential opening 3 increases more slowly since its area is in proportion to the product of the first power of that same diameter times the height of opening 3.

The principal object of the present invention is to minimize some of the foregoing objections in a substantial measure and eliminate others. More particularly the objects are: in each given size of treating device, to render the point, at which the minimum operating gas flow is reached, variable to a substantial degree, to increase the maximum gas flow substantially and to decrease the operating resistance substantially; and, in changing from one size to another, to eliminate any appreciable increase in resistance due to an increase in size or capacity.

In accordance with our invention, we provide a horizontal air-inlet and oil-feed plate, having axial rather than circumferential inlet openings for the incoming air, in combination with means for feeding liquid at a controlled rate to the edges of the openings on the upper side of the plate. The openings are dimensioned to insure, at the lowest operating air flow, an air velocity through each opening of sufficient magnitude to pick up liquid from the upper edges of the opening while the rate of liquid feed is restricted to a desired value which may approximate the lowest feed rate required to maintain the filter medium (or the liquid separating medium) in an efficient operating condition throughout its entire range of operating air flows.

With this arrangement, it becomes possible to direct the incoming air axially through both the plate openings and the inner cylinder directly into the filter medium whereby uniformity of distribution of both oil and air is insured. The minimum operating gas flow now becomes, for the most part, a function of the size of the plate openings; the maximum gas flow is increased not only because of uniformity of distribution of air and liquid but also because the amount of liquid in circulation does not progressively increase with the air flow; the operating resistance is decreased because less work is required from the pickup area to the filter medium; and the operating resistance of units of progressively larger sizes, having the same filter medium depth, is maintained the same because the free flow area in the zone of liquid pickup increases in the same proportion as the area of the filter medium.

Another object of the present invention is to provide the perforated air-inlet and liquid-feed plate with means for insuring a distribution of liquid across the entire filter medium even when the cleaner is tilted substantially from its normal vertical position.

Another important object is to provide the air-inlet and liquid-feed plate with openings which automatically increase in area from small areas at low air flows to large areas at high air flows so as to enable the cleaner to operate effectively over a wide range of operating air flows.

A further object is to provide an air or gas treating system utilizing two or more treating devices having valved air-inlet plates of different variable opening characteristics such that at the highest gas flow through the system all plate openings of all devices are open while as the system air flow progressively decreases the plate opening of certain devices will close automatically, leaving the other devices in operation.

The invention is illustrated in the accompanying drawings wherein:

Figure 1 schematically shows one type of conventional prior art cleaner of the general liquid-pickup class;

Figure 13 is a schematic view of an air-cleaning system embodying the present invention;

Figure 14 is a vertical section through a combination evaporator-cooler and gas cleaner, both of which embody the present invention;

Figure 15 is a section along line 15—15 of Figure 14 but showing one-half of the device; and Figure 16 is similar to Figure 15 but shows the other half of the device with the parts adjusted to a different position.

Figure 1:
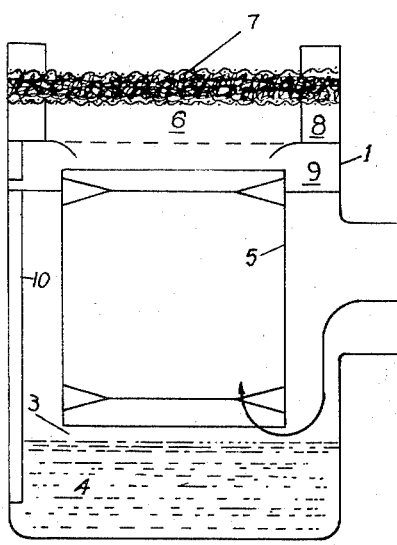

The conventional self-cleaning oil bath cleaner schematically shown in Figure 1 has been previously described. It should therefore suffice to say that this type of liquid-pickup cleaner is exemplified by U.S. Patent Fitch et al., No. 2,309,838, granted February 2, 1943.

Figure 2:
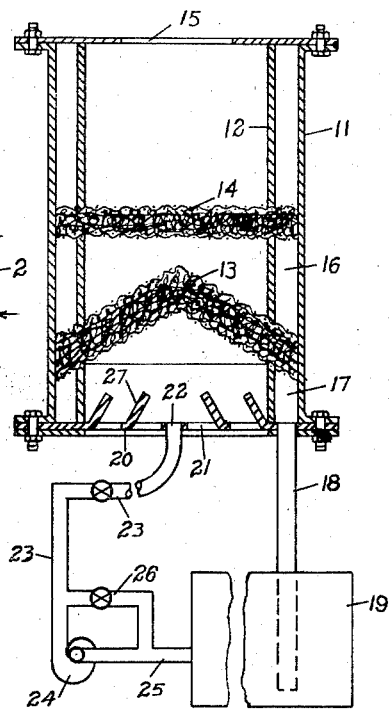
Figure 2 is a vertical section through a self-cleaning gas cleaner of the liquid-pickup type embodying our invention.

The air cleaner illustrated in Figure 2 comprises: an outer cylindrical metal shell or casing 11; an inner cylinder 12 horizontally divided into three sections which are separated to receive the filter mediums 13 and 14; a top clean air discharge opening 15; liquid drainage channels 16 and 17 between inner and outer cylinders; a drainage tube 18 and an oil sump 19.

In accordance with our invention an air-inlet and oil-feed plate 20 having openings 21 is provided at the bottom of the inner cylinder, this plate preferably being radially extended to close the bottom of the outer shell as well. The feed plate 20 has a liquid feeding opening 22 preferably centrally disposed, and connected through valved pipe 23, pump 24 and pipe 25 to the sump 19. Where desired, a normally closed valved bypass 26, connecting conduits 23 and 25, may be provided.

The feed plate 20 is preferably in the form of a flat disc although it may be slightly channel shaped between openings or slightly cup shaped cross-sectionally. In fact, it may be of any configuration which, when a liquid, such as oil, is fed to its upper surface at one or more points, will permit or cause that liquid to flow to and accumulate about the upper edges of the openings in the plate. When oil, for example, is fed to the center of a perfectly flat plate it will flow in all directions along the solid portions of the plate and form, around the upper edge of each opening in the plate, a shoulder of liquid as distinguished from a layer of liquid extending across and covering each opening.

The size and number of the openings 21 in the plate depend upon the operating range desired. For example, if an operating range, extending from the maximum air flow (100%) down to 50% of that maximum, is desired, the size and number of the openings will be designed to give, at the 50% air flow, a velocity through each opening of sufficient magnitude to pick up oil from the edge of that opening. If a smaller operating range of say, 80% to 100% is desired, the free flow area of the plate is increased by increasing the diameter of each opening so that a volume of air, equal to 80% of maximum, is required to bring the air velocity through the openings up to the minimum pickup velocity. With this decrease in operating range, the maximum air flow capacity of the cleaner remains the same, its efficiency should be unchanged but its operating resistance will decrease because the pressure drop across the plate necessarily decreases as its openings are made larger. Obviously, the operating range may be increased or extended by decreasing the free flow area so that a smaller volume of air, say 20%, is sufficient to bring the velocity through the openings up to the minimum pickup velocity. Here again, maximum capacity and efficiency remain the same but the operating resistance increases since the plate openings are made smaller.

It will thus be appreciated that this invention permits the minimum operating gas flow of any given size of cleaner of this type to be varied simply by substituting plates having a larger or smaller free flow area. We have obtained good results with openings ranging from 1/8 inch upwardly by fractions to 1½ inches. Theoretically, we see no limit to the range of opening sizes but, from a practical standpoint, the smaller the openings, the greater is their tendency to plug with dirt under normal operating conditions. Obviously, as the dust load in the air increases, the tendency to plug will increase. For normal air cleaning operations, we do not recommend openings less than 5/8 inch.

The minimum pickup velocity (MPV) will, of course, vary with variations in operating conditions such as temperature, oil viscosity, etc. It may also vary with the smaller sizes of openings. For example, 1/8 inch holes on 3/8 inch centers have an MPV approximately 510 lineal feet per minute with S.A.E. 30 oil at room temperature while, under the same conditions, 5/8 inch holes on 3/4 inch centers have an MPV approximately 725 lineal feet per minute. The MPV of larger openings may, under the same conditions, exceed 725 lineal feet per minute but it is unlikely that the MPV of the largest practical openings will exceed 1000 feet per minute.

While we have shown circular openings, it will be appreciated that openings of other configurations, such as slots, may be employed. The number of openings employed and their geometrical distribution may be varied considerably but normally they will be designed in these regards to produce uniformity of distribution of oil and air.

The filter pads 13 and 14 may be of any suitable viscous impingement type. We have used the crimped wire pad which consists of one or more single or individual strands of wire crimped along its length and folded upon itself to form a mass of desired density. These are commonly used in self-cleaning filters of the type shown in Figure 1. The filter pads 13 and 14 may be all of the flat pad type exemplified by pad 14. However, if flat pads are used under low operating velocity conditions, some of the oil, separated by the pad, will drop back onto the perforated plate. Under the same conditions, the conical filter pad 13 will drain properly. While its slope may vary, a slope of 30° works satisfactorily at all operating velocities including the extremely low. When a flat pad is replaced by a conical pad 14 of the same thickness and outside diameter, the maximum gas flow capacity of the cleaner is increased by as much as 50%; hence it is preferred.

Normally the amount of oil fed to the cleaner should be the minimum required to keep the filter medium coated and draining sufficiently to carry away the separated dust under all conditions of operation. In this connection, it may be noted that the amount of oil picked up by the Figure 1 cleaner at its lowest operating gas velocity usually constitutes an effective flow for all operating velocities; hence the progressive increase, which occurs in that oil flow with the higher air flows, normally is unnecessary and undesirable.

The resistance of this type of cleaner is relatively low. For example, a size 12 Figure 1 cleaner, having a maximum air volume of 380 c.f.m., had a resistance somewhat in excess of 3.0 inches of water whereas one representative embodiment of a size 12 Figure 2 cleaner having a maximum air volume somewhat in excess of 600 c.f.m. had a resistance of 1.8 inches of water. As the size of the Figure 1 cleaner progressively increases, its resistance increases also whereas the resistance of the Figure 2 cleaner should remain the same so long as the depth of the filter medium is unchanged. It may be desirable, in the larger sizes of the Figure 2 cleaner, to increase the filter medium depth somewhat but the resulting increase in resistance will normally be relatively small.

Cleaners of this type may be employed on tractors, tanks and other movable vehicles where they are likely to be tilted during operating intervals. In such cases, the holes are preferably provided with upwardly bent tabs 27 preferably formed by punching holes in the plate in a manner such as to leave the metal cutout for each hole attached to the plate through an arc approximating ³⁄₁₆ of an inch in length. Preferably these tabs 27 are formed to incline upwardly from their securement arc toward the axis of the major face of the plate. While the inclination angle may vary, we have attained excellent results with tab angles ranging upwardly to 60°.

Figure 5:
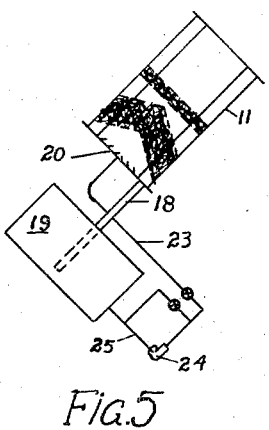
Figure 5 is a view similar to Figure 2 but showing the gas cleaner in a tilted position.

When the cleaner is tilted, as shown in Figure 5, one-half of the plate will slope below its center while the other half will slope above its center. The oil fed to the plate will flow downwardly on the lower half of the plate and the air entering this half of the plate will pick up oil. Most of this oil will be fed to the corresponding half of the filter medium and much of it will immediately drain off but, because of the direction of inclination of the tabs, some of the oil picked up will be thrown vertically into the "upper" vertical half of the filter medium 13 opposite the upper half of the plate. As a consequence, oil is distributed over the entire filter medium while the amount of oil fed to the "upper" vertical half of the filter medium will normally be sufficient for coating and cleaning purposes.

The minimum and maximum operating gas flows of this cleaner increase as it is tilted with a slight decrease in the extent of the operating range. The increase in the minimum operating gas flow can be shown by assuming that, when the cleaner is vertically arranged, 400 c.f.m. is required to produce the minimum pickup velocity in each of its openings. With this assumption, it is obvious that 200 c.f.m. will pass through the openings in each half of the horizontal plate. In its tilted position, however, more than 200 c.f.m. will pass through the openings on the upper half since they are substantially oil free; hence less than 200 c.f.m. will necessarily pass through the oil feed openings in the lower half of the plate. Since the lineal velocity, through the openings in the lower half of the tilted plate, is thus reduced below the minimum pickup velocity, the air flow through the cleaner as a whole must be increased in order to bring the velocity through the lower half openings up to the minimum pickup velocity. The maximum operating gas flow of the cleaner is also increased, when the cleaner is tilted and the oil flow unchanged, because, most of the oil is concentrated on the lower side of the filter medium in the tilted position and less oil is fed to the high side of the medium where most of the air will flow because of the disparity in oil concentration and, therefore, in resistance.

Figure 4:
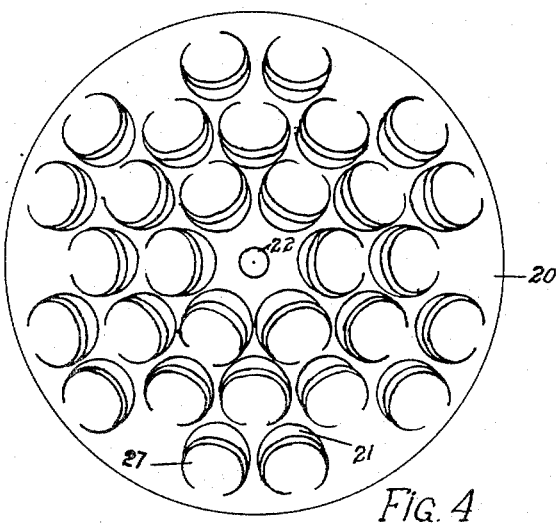
Figure 4 is a top plan view of a gas-inlet liquid-feed plate embodying my invention.

The performance of this type of a cleaner may be illustrated by reference to the operation of a Figure 2 cleaner provided with an inner cylinder 12 having an inside diameter of 6 inches and also provided with a plate of the character shown in Figure 4 having ¾ inch openings on ⅞ inch centers and 60° tabs 27. The operation of such Figure 2 cleaners is shown in Resistance Table I which follows; wherein V and T designate the vertical and 45° tilted positions respectively of the cleaner, C a conical filter having a 30° slope and a 3 inch depth, F a flat filter having the same outside diameter and 3 inch depth, and 0.64 and 0.268 the number of quarts of SAE 30 oil fed to the plate per hour per square inch of effective filter medium area, which is the area within the inner cylinder, the resistance values being given in the vertical columns in inches of water.

*Resistance Table I*

| Observations | Amt. of oil circulated in qts./hr./sq. in. of eff. area | Set-up shown in fig. 5 | | | |
|---|---|---|---|---|---|
| | | VF | TF | VC | TC |
| (1) Resistance with air volume at 150 c.f.m. | None | 0.715 | 0.710 | 0.600 | 0.609 |
| (2) Resistance with air volume at 250 c.f.m. | None | 1.91 | 1.93 | 1.61 | 1.66 |
| (3) Resistance at minimum oil action. | 0.64 | 0.558 | 0.702 | 0.275 | 0.500 |
| (4) Maximum resistance without oil entrainment. | 0.64 | 1.67 | 2.60 | 1.79 | 2.22 |
| (5) Air volume, c.f.m., at minimum oil action. | 0.64 | 73 | 115 | 69 | 115 |
| (6) Air volume, c.f.m., maximum without oil entrainment. | 0.64 | 150 | 250 | 225 | 275 |
| (7) Air volume, c.f.m., maximum without oil entrainment. | 0.268 | | | 275 | |
| (8) Velocity, f.p.m., through ¾" holes in perforated plate at minimum oil action air volume. | | 794 | 1,357 | 750 | 1,357 |
| (9) Maximum velocity through effective area of pad without oil entrainment. | 0.64 | 763 | 1,273 | 1,145 | 1,400 |
| (10) Maximum velocity through effective area of pad without oil entrainment. | 0.268 | | | 1,400 | |

Extremely wide variations in load or gas flow are encountered in various installations such as gas storage arrangements where natural gas is pumped underground for storage purposes during low utility system load intervals and then pumped from such storage chambers into the utility system as needed and in power plants using diesel engines where the load varies between idling and top speed. The present cleaner may be adapted for use with installations wherein wide variations of this type are encountered by providing the inlet and feed plate 20 with means for varying the size of the openings 21 in proportion to the air or gas flow, such means being shown in Figures 6–11.

Figure 6:
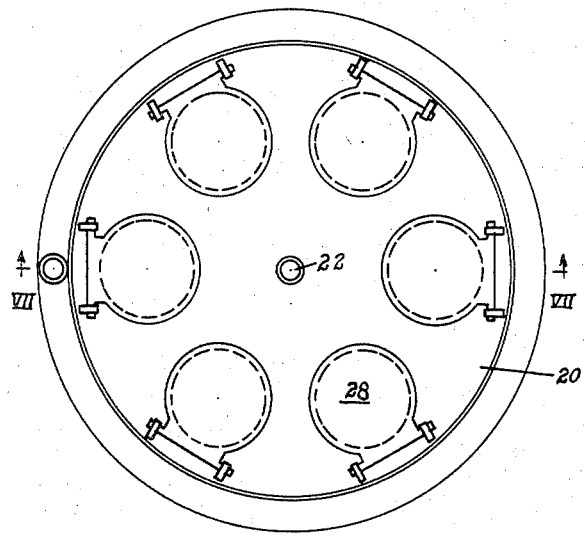
Figure 6 is a top plan view of another gas-inlet and liquid-feed plate embodying our invention.
Figure 7:
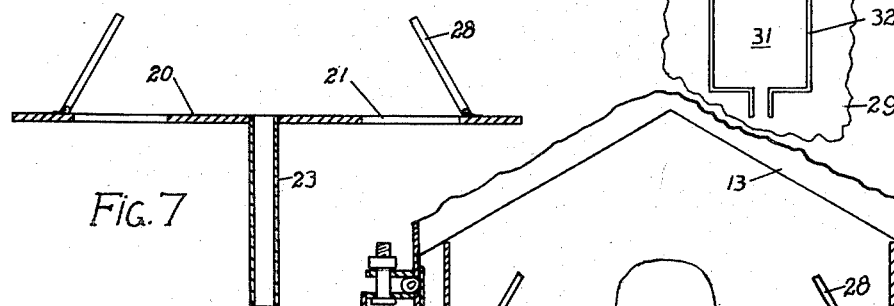
Figure 7 is a sectional view taken along line 7—7 of Figure 6.

In Figures 6 and 7, the openings 21 of plate 20 are, under shutdown conditions, normally closed by flapper valves 28, which are connected to the plate 20 by a conventional two part hinge. When operation is instituted a pressure differential will be created between opposite sides of each valve. When this differential barely exceeds the weight of each valve, the flappers 28 will automatically open to a slight degree permitting a small flow of air through the cleaner. Since the area of each opening is thus restricted to a small value, the minimum pickup velocity will be reached or exceeded although the total air volume is small. The pressure drop across each opening, which is a measure of the work done by the air in passing through the opening, will, of course, determine the extent to which the flapper valve is opened. Naturally the degree of valve opening thus effected by a given air flow may be varied by increasing or decreasing the resistance of the flapper valve to the opening movement and this may be accomplished by increasing or decreasing the weight of the flapper valve or otherwise controlling the ease or difficulty of moving that valve as by spring means.

Oil is fed as before and such oil will accumulate about each opening and be picked up by the air flowing through the opening. In this connection it should be understood that the pickup velocity required to remove liquid from the plate is higher than the velocity required to convey liquid with the air once it is removed from the plate. Consequently, while the air velocity will drop after it leaves the plate this does not mean that it will lose the liquid it has picked up in passing through the plate. Naturally, as more air flows through the plate, the flapper valve will be additionally opened by that air to increase the area of each opening until the valve is fully open. With this arrangement it will be appreciated that the feeding of oil to the filter medium may be maintained substantially throughout the full 100% operating range.

Figure 9:
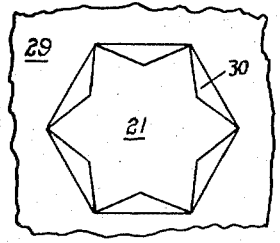
Figures 8 and 9 are fragmentary plan views of a modified form of a plate shown in Figure 6, the opening in the plate being closed in Figure 8 and open in Figure 9.
Figures 8, 12:
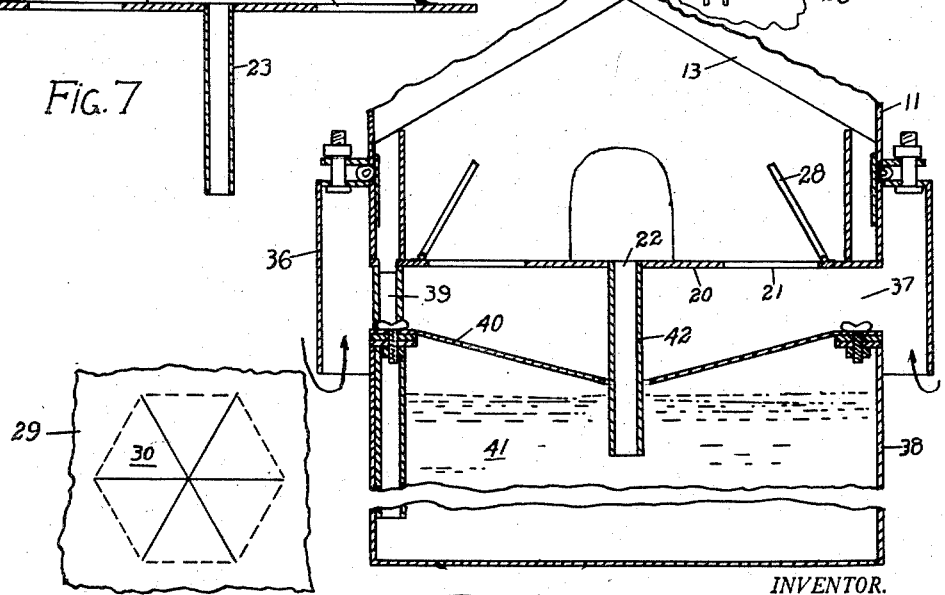
Figure 12 is a vertical section through the lower half of a gas cleaner embodying our invention showing a different liquid-feeding arrangement.

Figures 8 and 9 show a different valved plate arrangement wherein a plate 29, composed of a thin flexible or springy material such as rubber, plastic, thin metal, etc., is cut to provide triangular flappers 30 for each opening. These flappers are in the valve closed position under zero air or gas flow conditions as indicated in Figure 8 but they automatically open in proportion to the pressure differential under operating flow conditions as indicated in Figure 9.

Figure 10:
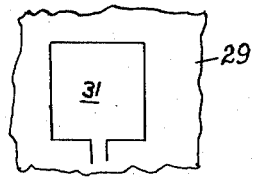
Figures 10 and 11 are fragmentary plan views of two additional modifications of plates such as are shown in Figures 6–8.

Figure 10 shows a similar arrangement comprising a plate 29, as before, but provided at each opening with a single flapper 31.

Figure 11:
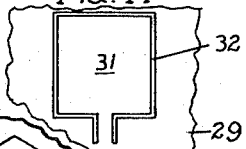

Figure 11 shows an arrangement which, like that of Figure 10, comprises a plate 29 and a single flapper 31 at each opening but here the flapper 31 is reduced in size to form a small opening 32 which permits an initial low flow of air through the cleaner under low pressure differential conditions, the opening 32 being small enough to insure the attainment of the required pickup velocity under low air flow conditions. As more and more air flows through the cleaner, the flappers will, of course, be deflected to increase the area of the opening as before. It will, of course, be understood that the flappers of Figures 8–11 are all formed simply by appropriately slitting the plate 29.

Figure 3:
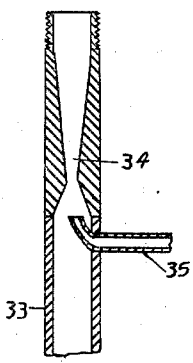
Figure 3 is a fragmentary view showing an air jet pump suitable for use as a pump in the Figure 2 arrangement.

The controlled feed of oil may be maintained at a constant rate or at a variable rate, preferably the former. It may be accomplished by any suitable means such as the pump 24 in Figure 2. Where a source of gas under suitable pressure is available, as is the case in underground storage installations, the pump 24 and its drive motor may be replaced by the air jet pump shown in Figure 3. This air jet pump comprises a tube 33, having a venturi 34, and an air jet tube 35. In substituting the air jet pump for the pump 24 in Figure 2 the tube 33 is interposed in the oil feed line to connect pipes 25 and 23 together while the air jet tube 35 is connected to a source (not shown) of gas under pressure so as to jet a stream of gas upwardly through the venturi 34 and thus create and maintain a flow of oil to the gas inlet and oil feed plate of the cleaner.

Another arrangement for feeding oil to the plate is illustrated in Figure 12. In this cleaner, the incoming air flows around the lower edge of a rain skirt 36 to flow successively through an annular inlet opening 37, and openings 21 in plate 20 to the conical filter 13. An oil sump 38 is spaced slightly below the plate 20 and cooperates therewith to form the annular opening 37, this sump being secured to the cleaner through any suitable means which may include the filter medium drain pipe 39. The top of the sump is covered by a lid 40 to shelter the bath 41 in the sump 38 from the air flow, the lid 40 being centrally perforated to receive the oil feed pipe 42.

At the lowest operative air flow, the pressure drop across the plate will cause oil to flow from bath 41 upwardly through feed tube 42 and feed opening 22 onto the upper side of the plate. For example, if this pressure drop is equal to one inch of liquid within pipe 42 and if the distance from the operating level of the bath to opening 22 is ⅞ of an inch, then, at the lowest operating air flow there will be an excess head of liquid equal to ⅛ inch causing liquid to flow onto the surface of the plate.

With unobstructed openings 21 the pressure drop across the plate will progressively increase as the air flow increases causing a progressive increase in the rate at which oil is fed. This can be entirely avoided or substantially minimized by using flapper valves 28 so designed as to provide either a constant pressure drop across the plate from the lower air flows upwardly through part or all of the operative air flow range or an increasing pressure drop which remains within allowable or desirable limits. With this arrangement the necessity of auxiliary oil feed equipment such as a pump and motor is eliminated.

It will be understood that with a flapper valve arrangement of the character shown in Figure 12 designed to have an operative air flow range extending upwardly from, say 5% of the full capacity, the flapper valves will not open if the demand for air is less than 5%. For example, when the demand for air amounts to say 3% of the capacity of the cleaner, the pressure differential created on opposite sides of the plate will be insufficient to open the flapper valves. It will only be when the demand for air equals or exceeds 5% that the pressure differential across the plate initially becomes great enough to crack open the flapper valves 28. It will therefore be appreciated that the operative range of the cleaner may be varied by increasing or decreasing the weight of the flapper valve. Use is made of this operating characteristic in the system shown in Figure 13.

The system shown in Figure 13 includes an air inlet chamber 45, a perforate partition 46 and an air outlet chamber 47. The perforate partition contains four openings and, in each opening, a Figure 12 cleaner is mounted so that air entering the inlet chamber 45 must pass through at least one of these cleaners in order to flow through the outlet chamber 47. For the sake of clarity, we assume that one cleaner is designed so that its flapper valves will not open until the pressure differential on opposite sides of the plate equals 0.2 inch. This cleaner is designated as the 2 tenths cleaner. When the system demand for air is such as to place this pressure differential across the plate of the 2 tenths cleaner, its valve will barely open and, as the demand for air increases, its valves will continue to open until they are wide open. The resistance across the plate may remain at .2 inch from the time these valves are first opened until they are wide open or it may increase slightly. When the air flow exceeds the value required to open the valves to their fullest extent, the pressure drop across the plates will begin to rise more rapidly.

The valves of the second cleaner will not begin to open until the pressure differential across its plate equals some higher value, say 5/10 of one inch. This cleaner is designated the half inch cleaner. As the demand for air continues beyond this point, the valves of the half inch cleaner will progressively open. The third cleaner is designated as the one inch cleaner because its valves will not begin to open until the pressure drop across the plate equals one inch while the fourth cleaner is designated as the two inch cleaner because its valves will not begin to open until the pressure drop or differential equals 2.0 inches of water.

It will be noted in the Figure 13 system that the oil sumps 38 of the cleaners, beginning with the two tenths cleaner are progressively lowered relatively to the feed plate in order to make the beginning of the oil feed 19 to each cleaner coincide with the pressure drop required to first open the valves of that cleaner.

While we have thus far described our invention as applied to an air cleaner, it is suited for other uses, including use as an evaporative cooler, one embodiment of which is illustrated in Figures 14–16. This evaporative cooler comprises: an outer lower metal cylindrical casing 51; an inner cylinder 52 horizontally divided into three sections which are separated to receive the filter mediums 53 and 54, which are identical to filter mediums 13 and 14 respectively of Figure 2; a top clean air discharge opening 55; liquid drainage channels 56 and 57 between inner and outer cylinders; a drainage tube 58; and a water sump 59, which is sealed from the lower side of the inlet air space by a plate 50. A water feed plate 60 having an opening 61 is provided at the bottom of the inner cylinder 52 and radially extended to close the bottom of drainage channel 57.

Now when water is fed to the plate 60 it will be picked up by the incoming air passing through the opening 61 thereof and carried into the filter medium which functions to separate the water from the air. The water thus separated forms thin films over the large surface provided by the filter medium so that a substantial portion of it will evaporate into the air, the remaining water draining from the filter mediums through the drainage system back to the sump.

While any water feeding means may be employed, the means shown comprises a casing 70 having an overflow weir 71 dividing it into a water level chamber 72 and a drainage chamber 73. The water level chamber is connected to the sump 59 by the pipe 74 and to the feed opening of the feed plate 60 by the pipe 75. A continuous stream of water of desired size is fed to the feed plate from the water level chamber 72 by adjusting the upper edge of the overflow weir 71 to a predetermined elevation relatively to the feed plate. For example, if the pressure drop across the plate at the lowest operating flow is ½ inch of water, then, by adjusting the weir so that it stands level with the plate, a head equal to ½ inch will be available to feed water to the plate at the lowest operative flow. As this flow progressively increases, the pressure drop across the plate will progressively increase creating an increased flow of water to the plate which normally is desirable in evaporative coolers. The water level chamber is constantly supplied through pipe 76 with enough makeup water to maintain a small overflow of water from the water level chamber 72 over to weir 71 into drainage chamber 73 which is suitably connected to a sewer. It will be understood that the sump level will extend upwardly through the drainage system to a level slightly above that of the feed plate. Humidifying efficiencies ranging from 58 to 75% have been obtained with coolers of this character.

It will be appreciated that an evaporative cleaner of the foregoing type will remove some dust from the air. Where the air thus cooled and partially cleaned is being fed to a diesel engine, it is desirable to remove substantially all of the residue dust. This may be done by interposing an air cleaner between the air outlet of the cooler and the air intake system of the diesel engine or other air receiving device. An air cleaner using our invention is admirably suited to this use and may be mounted on the upper end of the cooler as indicated in Figure 14.

The Figure 14 air cleaner like that of Figure 2 comprises: an outer casing 11; an inner cylinder 12 horizontally divided into three sections which are separated to receive the filter mediums 13 and 14; a top clean air discharge 15; liquid drainage channels 16 and 17 between inner and outer cylinders; a drainage tube 18; an oil sump 19a; a feed plate 20 having openings 21 and liquid feed opening 22; and oil feed means including a feed pipe 23 connected through pump 24 and pipe 25 to sump 19a.

The gas cleaner is separated from the evaporative cooler by an interposed casing 80 providing an inlet chamber for the gas cleaner, the casing 80 being bolted or otherwise secured at its lower and upper ends to the casings of the evaporative cooler and the gas cleaner respectively. Since it may be desirable to shut down the cooler and operate only the gas cleaner during cold weather periods, for example, the interposed casing 80 is provided with inlet openings 81 and surrounded by an annular band 82 having corresponding inlet openings 83, the band 82 being rotatable from one position (Figure 15) wherein its inlet openings 83 are aligned with the inlet openings 81 of the interposed casing to another position (Figure 16) wherein the annular band 82 closes or blocks the inlet openings of the interposed casing 80.

In order to prevent the dripping of any oil from the feed plate 20 of the gas cleaner into the evaporative cooler, a stationary turret baffle 84 is mounted in the gas cleaner inlet chamber over the cooler outlet opening, this baffle providing horizontally disposed surfaces 84 to receive the oil drip and circumferential openings permitting the upwardly flowing air from the cooler to pass from within the turret radially outward into the inlet chamber of the gas cleaner. Any oil dripping from the plate ultimately drains to the bottom of the inlet chamber and thence through pipe 85 back to sump 19a.

The performances of a combined cooler and cleaner and of the cleaner alone are indicated in Table II under the sections entitled "Using Oil and Water" and "Using Oil Only," wherein "w.g." designates water gauge, "g.p.hr." designates gallon per hour and "in." designates inches.

*Table II*

| Using oil and water: | | | |
|---|---|---|---|
| Air volume, c.f.m. | 5,300 | 4,060 | 2,740 |
| Total resistance, "w.g." | 6.76 | 4.05 | 2.25 |
| #30 SAE oil flow, g.p. hr. | 7.03 | 7.03 | 7.03 |
| Water flow, g.p. hr (to perforated plate) | 344 | 320 | 286 |
| Water control head, in. (above perforated plate) | 3.0 | 3.0 | 3.0 |
| Using oil only: | | | |
| Air volume, c.f.m. | 5,480 | 4,060 | 2,740 |
| Total resistance, "w.g." | 2.60 | 1.50 | 0.80 |
| Oil flow, g.p. hr. | 7.03 | 7.03 | 7.03 |

We claim as our invention:

1. A liquid pickup gas flow device comprising: a housing providing a confined path for the flow of gas therethrough; a liquid separating medium positioned in said housing across said path; and means for entraining liquid in the gas approaching said medium, said entraining means including aperture-forming means spaced upstream from said medium and presenting an aperture through which said approaching gas is normally constrained to sweep at a velocity not lower than the minimum required to pick up and thereby entrain liquid from said aperture-forming means along the edge of said aperture and means for supplying liquid to said aperture-forming means in amounts controlled to provide a shoulder of liquid extending along and adjacent to the edge of said aperture, to promote the concurrent flow of liquid and gas from the entraining means to the separating means and to demote any countercurrent flow of liquid from the entraining means, said liquid forming, on said aperture-forming means, a film or layer having a hole coinciding with and exposing said aperture as distinguished from a layer of liquid extending across and covering said aperture.

2. The device of claim 1 wherein: the gas flow through the housing is generally upward and over an operative gas flow range; the aperture-forming means is spaced below the separating medium; the gas flow through the aperture is upward and at velocities sufficient, in the operative range, for liquid pickup purposes; and the liquid supply is to the upper side of the aperture-forming means.

3. The device of claim 2 including: a gas deflector disposed adjacent to and extending over said aperture.

4. The device of claim 3 wherein: said deflector comprises a tab connected to said aperture-forming means.

5. The device of claim 2 including: means to vary the effective area of said aperture as the operative air flow varies over at least a portion of the operative range.

6. The device of claim 2 wherein: said liquid supply means includes a reservoir and means for pumping liquid from said reservoir to said aperture-forming means.

7. The device of claim 6 wherein: said pumping means is of the differential gas pressure type controlled by the pressure drop across the aperture-forming means.

8. The device of claim 7 including: a gas deflector disposed adjacent and extending over said aperture, said deflector moving in response to the differential pressure across said aperture to vary the effective area of said aperture as the operative air flow varies over at least a portion of the operative range.

9. A liquid pickup gas flow device comprising: a housing providing a confined path for the generally upward flow of gas therethrough over an operative gas flow range; a liquid separating medium positioned in said housing across said path; a plate positioned below said medium and across said path, said plate having a series of apertures through which the incoming gas is normally constrained to sweep upwardly at velocities sufficient, in the operative range, to pick up and thereby entrain liquid from said plate along the edges of said apertures; and means for supplying liquid to the upper side of said plate in amounts controlled to provide a shoulder of liquid adjacent the edges of said apertures, to promote the concurrent flow of liquid and gas from said plate to said separating medium and to demote any countercurrent flow of liquid from said plate, said liquid forming, on said plate, a film or layer having a series of holes coinciding with and exposing said apertures as distinguished from a layer of liquid extending across and covering said apertures.

10. The device of claim 9 including: a series of gas deflectors disposed adjacent to and extending over said apertures in position to interact with the gas flowing through said apertures.

11. The device of claim 10 wherein: said deflectors comprise tabs connected to said plate.

12. The device of claim 11 wherein: the apertures are disposed in the plate so as to lie around the longitudinal center of the device; and said tabs are inclined to direct gas leaving said apertures upwardly along paths inclined toward said longitudinal center.

13. The device of claim 10 wherein: said deflectors move in response to the differential pressure across said apertures to vary the effective area of said apertures as the operative air flow varies over at least a portion of the operative range.

14. The device of claim 13 wherein: said deflectors are composed of flexible material.

15. The device of claim 13 wherein: said deflectors are hinged to the plate.

16. The device of claim 9 wherein: said liquid supply means includes a reservoir and means for pumping liquid from said reservoir to said plate.

17. The device of claim 16 wherein: said pumping means is of the differential gas pressure type controlled by the pressure drop across the plate apertures.

18. A gas flow system comprising: a conduit accommodating an operative range of gas flow; and a pair of the devices specified in claim 9 arranged in parallel across the gas flow through said conduit, one device including means to vary the effective area of its apertures as the operative gas flow through the conduit varies over a portion of its operative range and the other device including corresponding means similarly operative over another portion of said operative range.

19. A liquid pick up gas flow device comprising: a housing providing a confined path for the generally upward flow of gas successively through a normally closed inlet zone, a pickup zone, a separating zone, a connecting zone, another liquid pickup zone and another separating zone, said gas being adapted to flow over an operative gas flow range; a liquid separating medium positioned in each separating zone to extend across said gas flow path; a plate positioned in each pickup zone to extend across said gas flow path, each plate having a series of apertures through which the gas flow is normally constrained to sweep upwardly at velocities sufficient, in the operative range, to pick up and thereby entrain liquid from said plate along the edges of said apertures; means for supplying liquid to the upper side of each plate in amounts controlled to provide a shoulder of liquid adjacent the edges of said apertures, to promote the concurrent flow of liquid and gas from said plate to said separating medium and to demote any countercurrent flow of liquid from said plate, said liquid forming, on said plate, a film or layer having a series of holes coinciding with and exposing said apertures as distinguished from a layer of liquid extending across and covering said apertures.

20. The device of claim 19 wherein: said housing has a normally closed gas inlet opening at the connecting zone, and said housing is adapted, when said inlet opening is opened, to receive gas in the connecting zone from a source other than the preceding separating zone.

21. The device of claim 19 wherein: the housing contains a baffle assembly dividing the connecting zone into one compartment receiving gas from the preceding separating zone and another compartment delivering gas to the succeeding pick up zone and providing horizontally disposed surfaces to receive any liquid dripping from the pick up plate in said succeeding pickup zone and circumferential openings enabling the gas in the receiving compartment to pass horizontally into said delivery compartment.

22. The liquid pick-up gas flow device of claim 1 used as an air filter wherein: unclean air is admitted to said housing upstream from said liquid entraining means and clean air is discharged from said housing downstream from said separating medium; said liquid separating means is a viscous impingement filter pad; said housing includes drainage means for conveying liquid away from said filter pad; and said liquid is oil which is entrained by the unclean air as it flows through said aperture and impinges on said filter pad to be separated from the air and form a coating of oil on the surfaces of said filter pad to which dirt particles, in the unclean air moving through said filter pad, adhere to, said entrained oil acting to continuously renew said coating and to wash the separated dirt particles from the surfaces of said filter pad as said oil is drained from said filter pad.

References Cited in the file of this patent

UNITED STATES PATENTS

| | | |
|---|---|---|
| 948,432 | Rudeen | Feb. 8, 1910 |
| 1,651,354 | Alexander | Dec. 6, 1927 |
| 1,782,735 | MacKenzie | Nov. 25, 1930 |
| 1,958,383 | Naucler et al. | May 8, 1934 |
| 2,007,759 | Harmon | July 9, 1935 |
| 2,015,174 | Anglemyer | Sept. 24, 1935 |
| 2,682,394 | Guthrie et al. | June 29, 1954 |

FOREIGN PATENTS

| | | |
|---|---|---|
| 509,927 | Germany | Oct. 14, 1930 |